US012286510B2

(12) United States Patent
Thiel et al.

(10) Patent No.: US 12,286,510 B2
(45) Date of Patent: Apr. 29, 2025

(54) COATING COMPOSITION OR SEALANT COMPRISING A COMPOUND WITH A FIVE-MEMBERED CYCLIC MONOTHIOCARBONATE GROUP

(71) Applicant: BASF SE, Ludwigshafen am Rhein (DE)

(72) Inventors: Indre Thiel, Ludwigshafen (DE); Markus Jegelka, Ludwigshafen (DE); Thomas Fenlon, Ludwigshafen (DE); Peter Rudolf, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 722 days.

(21) Appl. No.: 17/309,199

(22) PCT Filed: Nov. 18, 2019

(86) PCT No.: PCT/EP2019/081639
§ 371 (c)(1),
(2) Date: May 6, 2021

(87) PCT Pub. No.: WO2020/109053
PCT Pub. Date: Jun. 4, 2020

(65) Prior Publication Data
US 2021/0395454 A1   Dec. 23, 2021

(30) Foreign Application Priority Data

Nov. 30, 2018   (EP) ..................................... 18209383

(51) Int. Cl.
C08K 5/38       (2006.01)
C08G 71/04      (2006.01)
C08K 5/17       (2006.01)
C08K 5/46       (2006.01)
C09D 175/04     (2006.01)

(52) U.S. Cl.
CPC ............... *C08G 71/04* (2013.01); *C08K 5/17* (2013.01); *C08K 5/46* (2013.01); *C09D 175/04* (2013.01); *C08G 2150/00* (2013.01); *C08G 2190/00* (2013.01)

(58) Field of Classification Search
CPC ................... C08G 71/04; C08K 5/38
See application file for complete search history.

(56) References Cited

U.S. PATENT DOCUMENTS

| 3,201,416 | A | * | 8/1965 | Johnson | ............... C07D 327/04 |
| | | | | | 558/248 |
| 3,517,029 | A | | 6/1970 | Johnson | |
| 3,884,285 | A | * | 5/1975 | Russell | ..................... C08K 5/36 |
| | | | | | 523/213 |
| 9,416,214 | B2 | | 8/2016 | Keaton et al. | |
| 11,365,289 | B2 | | 6/2022 | Thiel et al. | |
| 11,814,344 | B2 | * | 11/2023 | Rudolf | .................. C07C 319/02 |
| 11,958,823 | B2 | | 4/2024 | Rudolf et al. | |
| 12,060,458 | B2 | | 8/2024 | Thiel et al. | |
| 2020/0239633 | A1 | | 7/2020 | Rudolf et al. | |
| 2020/0354333 | A1 | | 11/2020 | Rudolf et al. | |
| 2021/0171811 | A1 | | 6/2021 | Licht et al. | |
| 2021/0309805 | A1 | | 10/2021 | Thiel et al. | |
| 2024/0279199 | A1 | | 8/2024 | Rudolf et al. | |

FOREIGN PATENT DOCUMENTS

| CN | 104395369 | | 3/2015 | |
| EP | 2 468 791 | | 6/2012 | |
| EP | 2468791 | A1 * | 6/2012 | ......... C08G 59/1411 |
| JP | H0762190 | A * | 3/1995 | |
| JP | H09-59324 | A | 3/1997 | |
| JP | H11-292969 | | 10/1999 | |
| JP | 2000-204159 | | 7/2000 | |
| JP | 2002-53706 | | 2/2002 | |
| JP | 2007-178903 | | 7/2007 | |
| JP | 2012-232954 | | 11/2012 | |
| WO | 2011/157671 | | 12/2011 | |
| WO | 2013/144299 | | 10/2013 | |
| WO | WO-2014/208643 | A1 | 12/2014 | |
| WO | 2019/034468 | | 2/2019 | |
| WO | 2019/034469 | | 2/2019 | |
| WO | 2019/034470 | | 2/2019 | |
| WO | 2019/034473 | | 2/2019 | |

OTHER PUBLICATIONS

Takao et al. JP H0762190 translation. (Year: 1995).*
U.S. Office Action dated May 6, 2022 in U.S. Appl. No. 16/639,339, 15 pages.
U.S. Office Action dated Feb. 27, 2023, in U.S. Appl. No. 16/639,204, 15 pages.
U.S. Office Action dated Nov. 1, 2022, in U.S. Appl. No. 16/639,204, 17 pages.
International Search Report issued Feb. 12, 2020, in International Application No. PCT/EP2019/081639, 4 pages.
Reynolds, et al., "Mercaptoethylation. II. Preparation of 2-Mercaptoethyl Carbamates and Oligoethylene Sulfides", The Journal of Organic Chemistry, vol. 26, Issue 12, Dec. 1, 1961, pp. 5111-5115.

(Continued)

*Primary Examiner* — Cachet I Proctor
(74) *Attorney, Agent, or Firm* — Grüneberg and Myers PLLC

(57) ABSTRACT

A process for preparing coatings or sealed materials using a coating composition or a sealant that contains a first component and a second component. The first component includes a compound A) with at least one five-membered cyclic monothiocarbonate group. The second component includes a compound B) with at least one amino group. The at least one amino group can be a primary or secondary amino group or blocked primary or secondary amino group. Compounds A) or B) may additionally have at least one polymerizable, ethylenically unsaturated group. The coating composition or sealant may further include a compound C) with at least one polymerizable, ethylenically unsaturated group.

14 Claims, No Drawings

(56) References Cited

OTHER PUBLICATIONS

U.S. Office Action dated Mar. 28, 2022 in U.S. Appl. No. 16/639,204, 14 pages.
U.S. Appl. No. 16/639,204, filed Feb. 14, 2020, 2020/0239633, Rudolf et al.
U.S. Appl. No. 16/639,339, filed Feb. 1, 2020, 2020/0354333, Rudolf et al.
Castro et al., "Kinetics and Mechanism of the Reactions of Quinuclidines with Ethyl S-Aryl Thiolcarbonates", J. Org. Chem., vol. 64, No. 22, 1999, pp. 8298-8301.
U.S. Office Action dated Sep. 27, 2023, in U.S. Appl. No. 17/257,749, 21 pages.
U.S. Office Action dated Sep. 28, 2023, in U.S. Appl. No. 17/270,187, 13 pages.
Reynolds et al., "Mercaptoethylation. I. Mercaptoethylation of Amines with Ethylene Monothiolcarbonate", Mercaptoethylation. I, vol. 26, Dec. 1961, pp. 5109-5110.
Zhou Zhongqing, "Development of Synthesis, from Carbon Dioxide to High Molecular Compound", Higher Training School of Petrochemical Industry of Shanghai, Mar. 20, 1995, pp. 47-49, with English abstract.
U.S. Appl. No. 17/257,749, filed Jan. 4, 2021, 2021/0171811, Licht et al.
U.S. Appl. No. 17/270,187, filed Feb. 22, 2021, 2021/0309805, Thiel et al.
Sanda et al., "New Transformation of 1,3-Oxathiolane-2-thione into 1,3-Dithiolan-2-one via Polymerization and Depolymerization", Macromol. Rapid Commun., vol. 22, No. 5, 2001, pp. 363-366.
U.S. Office Action dated Sep. 28, 2024, in U.S. Appl. No. 18/595,535, 15 pages.
U.S. Appl. No. 18/595,535, filed Mar. 5, 2024, 2024/0279199, Rudolf et al.

* cited by examiner

COATING COMPOSITION OR SEALANT COMPRISING A COMPOUND WITH A FIVE-MEMBERED CYCLIC MONOTHIOCARBONATE GROUP

CROSS-REFERENCE TO RELATED APPLICATIONS

This application is the National Stage entry under § 371 of International Application No. PCT/EP2019/081639, filed on Nov. 18, 2019, and which claims the benefit of European Application No. 18209383.1, filed on Nov. 30, 2018. The content of each of these applications is hereby incorporated by reference in its entirety.

BACKGROUND OF THE INVENTION

Field of the Invention

Object of the invention is a process for the preparation of coatings or sealed materials, wherein a coating composition or a sealant is used comprising
- a first component which comprises a compound A) with at least one five-membered cyclic monothiocarbonate group and
- a second component which comprises a compound B) with at least one amino group, selected from primary or secondary amino groups or blocked primary or secondary amino groups, hereinafter referred to as amino groups,
and wherein compounds A) or B) may additionally have at least one polymerizable, ethylenically unsaturated group and
wherein the coating composition or sealant may further comprise a compound C) with at least one polymerizable, ethylenically unsaturated group.

Description of Related Art

Polyurethanes are important industrial polymers. They have very good mechanical properties and are therefore used in many technical applications, for example as binder in coatings and sealings.

Polyurethane-based coating compositions and sealants are usually applied as two-component systems, which consist of one component comprising a polyisocyanate and a second component comprising a polyol. The two components are mixed and are applied to obtain the desired polyurethane based coating or sealing.

Compounds with isocyanate group are usually highly reactive. Such reactivity leads to increased moisture sensitivity which is problematic in some technical applications. Some compounds with isocyanate groups are considered to be harmful and may cause allergies in case of skin contact or inhalation.

There is a demand to find alternative polymers with urethane groups. Such alternative polymers should not be obtained from polyisocyanates but should be suitable for the preparation of coatings and sealants with good application properties.

WO 2013/144299 discloses radically polymerizable compounds with a cyclic five membered carbonate ring system (alkylidene-1,3-dioxolan-2-one). Urethane groups are formed by reacting these compounds or polymers thereof with amino compounds. Similar compounds are disclosed in WO 2011/157671 for the use as reactive diluents in epoxy resins. However, the synthesis of such compounds is tedious. Necessary precursors of the synthesis are not commercially available.

The object of EP-A 2468791 are epoxy compositions that comprise compounds with five-membered cyclic ring systems comprising oxygen and sulfur.

D. D. Reynolds, D. L. Fields and D. L. Johnson. Journal of Organic Chemistry, 1961, page 5111 to 5115, disclose compounds with a five-membered cyclic monothiocarbonate ring system and reactions thereof. Inter alia a reaction with an amino compound is mentioned.

Unpublished European patent applications with application number 17186542.1 (INV 170282) and 17186545.4 (INV 170283) relate to a process for the synthesis of compound with at least one monothiocarbonate group.

Unpublished European patent applications with application number 17186543.9 (INV 170338) and 17186544.7 (INV 170938) relate to polymers which are obtained by reacting compounds with at least one monothiocarbonate group.

SUMMARY OF THE INVENTION

It was an object of this invention to provide an alternative method for the preparation of coatings and sealings. The use of compounds with isocyanate groups should be avoided. The obtained coatings and sealings should have good application properties, such as mechanical properties, optical properties, stabilities as UV and corrosion protection.

Accordingly, the process described above and coatings and sealings obtained by the process have been found.

DETAILED DESCRIPTION OF THE INVENTION

To Compound A)

Compound A) comprises at least one five-membered cyclic monothiocarbonate group.

The five-membered cyclic monothiocarbonate group is a ring system with 5 members, three of them are from the monothiocarbonate —O—C (=O)—S— and the further two members are carbon atoms closing the five-membered cycle.

Compound A) may be a low molecular compound or a polymeric compound and may comprise, for example, up to 1000, notably up to 500, preferably up to 100 five-membered cyclic monothiocarbonate groups and up to 1000, notably up to 500, preferably up to 100 polymerizable, ethylenically unsaturated groups.

Compound A) may be, for example, a urethane groups comprising adduct obtained by reacting compounds with monothiocarbonate groups and compounds with primary or secondary amino groups whereby the monothiocarbonate groups are in stoichiometric excess compared with the amino groups, thus giving a urethane groups comprising adduct which still has monothiocarbonate groups.

In a preferred embodiment, compound A) comprises one to three cyclic monothiocarbonate groups.

In a most preferred embodiment compound A) comprises one or two five-membered cyclic monothiocarbonate groups Preferred compounds A) have a molecular weight of up to 10000 g/mol, notably up to 5000 g/mol and particularly up to 1000 g/mol. Most preferred are compounds A) having a molecular weight of up to 500 g/mol.

Compounds A) may comprise polymerizable, ethylenically unsaturated groups, ether or carboxylic ester groups.

In a preferred embodiment, compounds A) do not comprise other functional groups than cyclic monothiocarbonate groups, polymerizable, ethylenically unsaturated groups, ether, thioether or ester groups.

Preferred Compounds A) are Compounds of Formula I

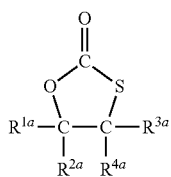

with $R^{1a}$ to $R^{4a}$ independently from each other representing hydrogen or an organic group with up to 50 carbon atoms whereby, alternatively, $R^{2a}$, $R^{4a}$ and the two carbon atoms of the thiocarbonate group may also together form a five to ten membered carbon ring or compounds of formula II

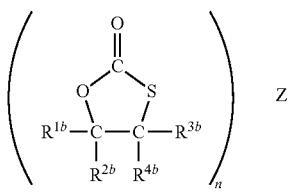

with $R^{1b}$ to $R^{4b}$ independently from each other representing hydrogen or an organic group with up to 50 carbon atoms whereby, alternatively, $R^{2b}$, $R^{4b}$ and the two carbon atoms of the monothiocarbonate group may also together form a five to ten membered carbon ring, and with one of the groups $R^{1b}$ to $R^{4b}$ being a linking group to Z, n representing an integral number of at least 2 and Z representing a n-valent organic group.

To Compounds A) of Formula I

Compounds A) of formula I have one five-membered cyclic monothiocarbonate group, only.

In case that any of $R^{1a}$ to $R^{4a}$ represent an organic group, such organic group is preferably an organic group with up to 30, more preferably up to 20 carbon atoms carbon atoms. In a further preferred embodiment $R^{1a}$ and $R^{4a}$ do not form a five to ten membered carbon ring together with the two carbon atoms of the thiocarbonate group.

In case that any of $R^{1a}$ to $R^{4a}$ represent an organic group, such organic group may comprise heteroatoms and functional groups as listed above. In particular, it may comprise oxygen, nitrogen, sulfur, silicon and chloride. In a preferred embodiment, the organic group may comprise oxygen or chloride. $R^{1a}$ to $R^{4a}$ may comprise oxygen for example in form of ether, hydroxy, aldehyde, keto or carboxy groups. In a preferred embodiment, the organic group is an aliphatic organic group with up to 30 carbon atoms which may comprise oxygen, nitrogen or chloride, in particular oxygen.

In a more preferred embodiment, the organic group is selected from an alkyl group, from a group —$CH_2$—O—$R^{5a}$ or a group —$CH_2$—O—C(=O)—$R^{6a}$ or a group —$CH_2$—$NR^{7a}R^{8a}$ with $R^{5a}$ to $R^{8a}$ being an organic group with up to 30 carbon atoms, preferably up to 20 carbon atoms. In particular, $R^{5a}$ to $R^{8a}$ represent an aliphatic or aromatic group, which may comprise oxygen, for example in form of ether groups. In a preferred embodiment, $R^{5a}$ to $R^{8a}$ represent an aliphatic hydrocarbon group, such as an alkyl group with 1 to 10 carbon atoms, an alkoxy group or a poly-alkoxy group. In a most preferred embodiment, $R^{5a}$ to $R^{8a}$ represent an aliphatic hydrocarbon group, notably an alkyl group with 1 to 10 carbon atoms.

In a most preferred embodiment, the organic group is a group —$CH_2$—O—$R^{5a}$ or a group —$CH_2$—O—C(=O)—$R^{6a}$.

Preferably, two to all four of $R^{1a}$ to $R^{4a}$ in formula I represent hydrogen and the remaining groups $R^{1a}$ to $R^{4a}$ represent an organic group.

More preferably, two and or three of $R^{1a}$ to $R^{4a}$ in formula I represent hydrogen and the remaining groups $R^{1a}$ to $R^{4a}$ represent an organic group.

Most preferably, three of $R^{1a}$ to $R^{4a}$ in formula II represent hydrogen and the remaining group of $R^{1a}$ to $R^{4a}$ represents an organic group. In a preferred embodiment $R^{1a}$ or $R^{2a}$ is the remaining group representing an organic group.

As preferred compounds A) with one five-membered monothiocarbonate group may be mentioned:

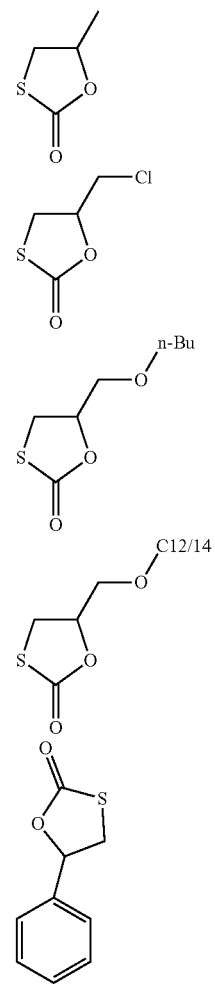

To Compounds A) of Formula II

Compounds A) of formula II have at least two five-membered cyclic monothiocarbonate groups.

In case that any of $R^{1a}$ to $R^{4a}$ represent an organic group, such organic group is preferably an organic group with up to 30 carbon atoms. In a further preferred embodiment $R^{2b}$ and $R^{4b}$ do not form a five to ten membered carbon ring together with the two carbon atoms of the thiocarbonate group.

In case that any of $R^{1b}$ to $R^{4b}$ represent an organic group, such organic group may comprise other elements than carbon and hydrogen. In particular, it may comprise oxygen, nitrogen, sulfur and chloride. In a preferred embodiment, the organic group may comprise oxygen or chloride. $R^{1b}$ to $R^{4b}$ may comprise oxygen for example in form of ether, hydroxy, aldehyde, keto or carboxy groups.

One of the groups $R^{1b}$ to $R^{4b}$ is the linking group to Z.

Preferably, the linking group is simply a bond or a group $CH_2$—O— or $CH_2$—O—C(=O)— or $CH_2$—$NR^{5b}$— with $R^{5b}$ being an aliphatic group, notably an alkyl group with at maximum 20 carbon atoms.

More preferably, the linking group is simply a bond or a group $CH_2$— or a group $CH_2$—O— or a group $CH_2$—O—C(=O)—.

In a most preferred embodiment, the linking group is a group $CH_2$—O—.

Preferably, two or three of the groups $R^{1b}$ to $R^{4b}$ in formula I are hydrogen.

In a most preferred embodiment three of the groups $R^{1b}$ to $R^{4b}$ represent hydrogen and the remaining group of $R^{1b}$ to $R^{4b}$ is the linking group to Z.

In a most preferred embodiment groups $R^{1b}$ to $R^{4b}$ is the linking group to Z.

n represents an integral number of at least 2. For example, n may be an integral number from 2 to 1000, specifically from 2 to 100 respectively 2 to 10.

In a preferred embodiment n is an integral number from 2 to 5, in particular n is 2 or 3.

In a most preferred embodiment n is 2.

Z represents a n-valent organic group. In case of high number of n, such as, for example, 10 to 1000, Z may be a polymeric group, in particular a polymer-backbone, obtained, for example by polymerization or copolymerization, such as radical polymerization of ethylenically unsaturated monomers, polycondensation or polyaddition. For example, polyesters or polyamides are obtained via polycondensation under elimination of water or alcohol and polyurethanes or polyureas are obtained via polyaddition.

Such compounds of formula III are, for example, polymers obtained by radical polymerization or copolymerization of ethylenically unsaturated monomers comprising monothiocarbonate groups or of monomers comprising epoxy groups which are then transferred into a monothiocarbonate group.

In a preferred embodiment Z is a n-valent organic group with up to 50 carbon atoms, in particular up to 30 carbon atoms, and which may comprise other elements than carbon and hydrogen and n is an integral number from 2 to 5, notably 2 or 3, most preferred 2.

In a particularly preferred embodiment Z is a n-valent organic group with up to 50 carbon atoms, in particular up to 30 carbon atoms, and which comprises carbon, hydrogen and optionally oxygen, only and no further elements and n is an integral number from 2 to 5, notably 2 or 3, most preferred 2.

In a preferred embodiment Z is a polyalkoxylene group of formula G1

(V—O—)$_m$V wherein V represents a C2-to C20 alkylen group and m is an integral number of at least 1. The terminal alkylene groups V are bonded to the linking group, which is one of the groups $R^{1b}$ to $R^{4b}$, see above.

Preferably, the C2-C20 alkylen group is a C2- to C4 alkylen group, in particular ethylene or propylene. m may, for example, be an integral number from 1 to 100, in particular from 1 to 50.

In a further preferred embodiment Z is a group of formula G2

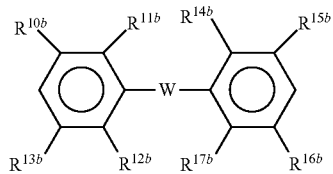

wherein W is a bi-valent organic group with at maximum 10 carbon atoms and n is 2 and $R^{10b}$ to $R^{17b}$ independently from each other represent H or a C1- to C4 alkyl group and wherein the two hydrogen atoms in the para position to W are replaced by the bond to the linking group, which is one of the groups $R^{1b}$ to $R^{4b}$, see above.

Preferably, at least six of $R^{10b}$ to $R^{17b}$ are hydrogen. In a most preferred embodiment all of $R^{10b}$ to $R^{17b}$ are hydrogen.

Groups W are, for example:

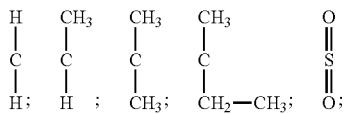

Preferably, W is an organic group that consists of carbon and hydrogen, only.

Most preferred W is

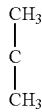

which corresponds to the structure of bisphenol A.

In a further preferred embodiment Z is a group G3, wherein G3 represents an alkylene group, notably a C2 to C8 alkylene group; preferred examples of such an alkylene group are ethylene ($CH_2$—$CH_2$), n-propylen ($CH_2$—$CH_2$—$CH_2$) and notably n-butylene ($CH_2$—$CH_2$—$CH_2$—$CH_2$).

Examples for preferred compounds with at least two five-membered cyclic monothiocarbonate groups are in particular those compounds which are obtained by transferring all epoxy groups of the following epoxy compounds into five-membered cyclic monothiocarbonate groups:

Non-Glycidyl Epoxides:
1,2:5,6-diepoxyhexahydro-4,7-methanoindan, bis (3,4-epoxycyclohexylmethyl) adipate, 1,4-cyclohexanedimethanol bis(3,4-epoxycyclohexanecarboxylate, 1-methyl-4-(2-methyloxiranyl)-7-oxabicyclo[4.1.0]heptane, 4-vinylcyclohexene dioxide, 1,2,5,6-diepoxycyclooctane, 1,2,7,8-diepoxyoctane, dicyclopentadiene dioxide, epoxidized plant oils or derivatives thereof, for example soy bean oil or derivatives thereof.

Glycidylether:
Bisphenol A diglycidylether (BADGE), hydrogenated BADGE, glycidylether of other di-, tri, tetra- and polyols such as butandiol-diglycidylether, trimethylolpropan-triglycidylether, pentaerythritol tetraglycidyl ether, sorbitolpolyglycidylether, isosorbiddiglycidylether, methylphenlypropandioldiglycidylether. This includes also oligomeric/polymeric glycidylether such as e.g. polypropylenglycoldiglycidylether, polyglycerolpolyglycidylether, novolac-glycidylether, oligomers or polymers obtained by reacting bisphenol A with an excess of epichlorhydrin.

Glycidylester:
Tetrahydrophthalic acid diglycidyl ester, Diglycidyl 1,2-cyclohexanedicarboxylate, Diglycidylorthophthalate Glycidyl Amine:
N,N-Diglycidyl-4-glycidyloxyaniline, Tetraglycidylmethylenedianiline Glycidylimide:
triglycidyl isocyanurate Particularly preferred compounds A) with at least two five-membered cyclic monothiocarbonate groups are compounds of formula III

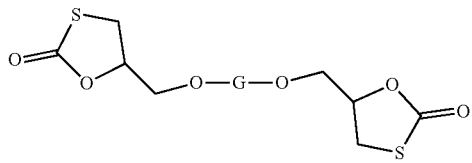

wherein G represents an alkylen group with 2 to 10, notably 2 to 6 carbon atoms and
1,2-Cyclohexanedicarboxylic acid, 1,2-bis[2-oxo-1,3-Oxathiolan-5-yl] ester which has the formula

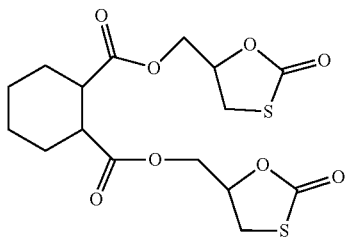 [SMILES: O=C1OC(COC(=O)C2CCCCC2C(=O)OCC2CSC(=O)O2)CS1]

A preferred compound of formula III is bis-1,3-Oxathiolan-2-one, 5,5'-[1,4-butanediylbis(oxymethylene)] which has the formula

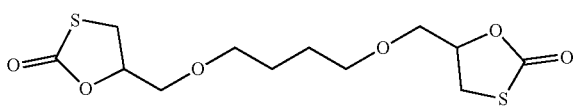 [SMILES: O=C1OC(COCCCCOCC2CSC(=O)O2)CS1]

to compounds A) with a polymerizable, ethylenically unsaturated group:
Compounds A) may also comprise at least one polymerizable, ethylenically unsaturated group.
Preferred compounds A) with at least one polymerizable, ethylenically unsaturated group are compounds A) of formula I wherein one of $R^{1a}$ to $R^{4a}$ represents an organic group comprising one polymerizable, ethylenically unsaturated group and the remaining three of $R^{1a}$ to $R^{4a}$ represent hydrogen or an organic group with at maximum 20 carbon atoms; preferably the remaining three of $R^{1a}$ to $R^{4a}$ represent hydrogen.

Preferred examples of polymerizable, ethylenically unsaturated groups are the vinyl group $H_2C=CH-$, the olefinic group $-HC=CH-$, wherein the two carbon atoms of the double bond are each substituted by one hydrogen, only, and the further substituents are notably carbon atoms, and the acrylic or methacrylic group, shortly referred to as (meth)acrylic group. In this patent application the term "vinyl group" does not include the (meth)acrylic group.

In a more preferred embodiment, the polymerizable, ethylenically unsaturated group is a (meth)acrylic group, most preferably a methacrylic group.

Preferably, compound A comprises no or one polymerizable, ethylenically unsaturated group.

Examples for compounds A) with a polymerizable, ethylenically unsaturated group are 5-butenyl-1,3-oxathiolane-2-on of formula:

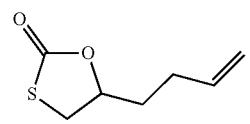

5-ethenyl-1,3-oxathiolane-2-on of formula:

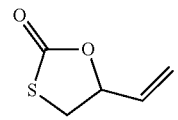

5-(ethenyloxy)methyl-1,3-oxathiolane-2-on of formula

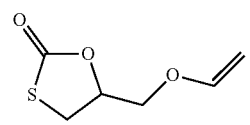

5-(2-propen-1-yloxy)methyl-1,3-oxathiolane-2-on of formula:

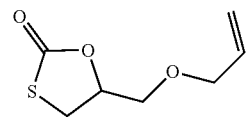

5-(methacryloyloxy)methyl-1,3-oxathiolane-2-on of formula:

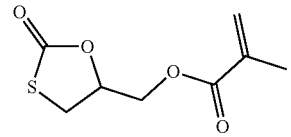

and 5-(acryloyloxy)methyl-1,3-oxathiolane-2-on of formula:

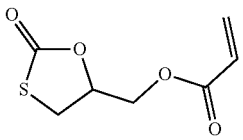

Most preferred are 5-(methacryloyloxy)methyl-1,3-oxathiolane-2-on and 5-(acryloyloxy)methyl-1,3-oxathiolane-2-on.

To the Synthesis of Compounds A)

Some methods for the synthesis of compounds with one monothiocarbonate group are described in the state of the art.

According to U.S. Pat. Nos. 3,072,676 and 3,201,416 ethylene monothiocarbonates may be prepared by a two-step-process. In a first step mercaptoethanol and chloro carboxylates are reacted to give hydroxyethylthiocarbonate, which is heated in the second step in a presence of metal salt catalyst to the ethylene monothiocarbonate.

According U.S. Pat. No. 3,517,029 alkylene monothiocarbonates are obtained by reacting mercaptoethanol and a carbonate diester in the presence of a catalytically active salt of thorium.

According to the process disclosed in U.S. Pat. No. 3,349,100 alkylene monothiocarbonates are obtained by reacting an epoxide with carbonylsulfide. The availability of carbonylsulfide is limited. Yields and selectivities of alkylene monothiocarbonates obtained are low. M.

A synthesis using phosgene as starting material is known from U.S. Pat. No. 2,828,318. Phosgene is reacted with hydroxymercaptanes. Yields of monothiocarbonates are still low and by products from polymerization are observed.

A preferred process for the preparation of compounds A) and C), is a process wherein
  a) a compound with at least one epoxy groups (shortly referred to as epoxy compound) is used as starting material
  b) the compound is reacted with phosgene or an alkyl chloroformate thus giving an adduct and
  c) the adduct is reacted with a compound comprising anionic sulfur to give the compound with at least one five-membered cyclic monothiocarbonate groups This process is in detail described in unpublished European patent application with application number 17186545.4 (INV 170283).

To Compound B)

Compound B) is a compound with at least one amino group, selected from a primary or a secondary amino group. In this patent application the word amino group shall mean a primary or secondary amino group if not indicated otherwise or obvious from the content otherwise.

Compound B) may have, for example, a molecular weight of up to 500.000 g/mol. The latter might be the case if compound B) is a high molecular compound such as a polymer comprising amino groups.

Compound B) may be, for example, a urethane groups comprising adduct obtained by reacting compounds with monothiocarbonate groups and compounds with primary or secondary amino groups whereby the amino groups are in stoichiometric excess compared to the monothiocarbonate groups, thus giving a urethane groups comprising adduct which still has primary or secondary amino groups but no monothiocarbonate groups.

Preferred compounds B) have a molecular weight of up to 10000 g/mol, notably of up to 5000 g/mol and particularly of up to 1000 g/mol. Most preferred are compounds B) having a molecular weight of from 60 g/mol to 500 g/mol.

Compounds B) do not comprise any monothiocarbonate groups.

Compounds B) may comprise polymerizable, ethylenically unsaturated groups, ether or carboxylic ester groups.

In a preferred embodiment compounds B) do not comprise any other functional groups than primary or secondary amino groups, polymerizable, ethylenically unsaturated groups or ether groups.

In a preferred embodiment compounds B) comprise 1 to 10 amino groups, preferably 1 or 5 amino groups and, in a most preferred embodiment compound B) comprises 1 to 5 amino groups.

In a preferred embodiment at least one of the amino groups of B) is a primary amino group.

In a most preferred embodiment all amino groups of compound B) are primary amino groups.

Compounds B) with one amino group are, for example, monoalkylamines with a primary amino group such as C1 to C20 alkylamines or cycloalkyl amines or etheramines such as 2-methoxyethylamine or 3-methoxypropylamine or di- or polyether amines such as di- or polyglycol amine, polyoxypropylene amine.

Compounds B) with more than one amino group are, for example,
  alkylendiamines or alkylenpolyamines such as ethylenediamine, propylenediamine, butylene diamine, pentamethylene diamine, hexamethylene diamine, neopentanediamine, octamethylendiamine, 1,3 diaminopentane, 2-Methylpentan-1,5-diamin
  alkylendiamines or alkylenpolyamines comprising ether groups (polyetheramine) such as such polyglycoldiamine, oxypropylene diamine or polyoxypropylene diamine.
  cycloaliphatic diamines, such as cyclohexyldiamines, for example 1,2 diaminocyclohexane, 1-methyl-2,4-diaminocyclohexane, 1-methyl-2,6-diaminocyclohexane or mixtures thereof, isophorone diamine, bis(4-aminocyclohexyl)methane, 1,3-bis(aminomethyl)cyclohexane, 1,4-bis(aminomethyl)cyclohexane, 2,5-bisaminomethyl tetrahydrofuran, 3,3'-Dimethyl-4,4'diaminodicyclohexylmethane
  aromatic diamines such as 1,2-phenylendiamine or 1,4 phenylendiamine, toluene diamines, 4,4' diamino-diphenylmethane, 4,4' diaminodiphenylsulfone, 2,5-bisaminomethyl furan, Compounds B) may also be used in a form wherein the amino groups are protected with a protecting group. As soon as it become necessary or desired the protecting group is removed so that the compounds B) above with free amino groups are obtained. Usually, removal of the protecting groups occurs under the conditions of the reaction. Usual protected amino groups for amino groups are, for example, ketamine, aldimine, imidazolidine, oxazolidine, lewis acid complexed amines, carbamates, benzyloxycarbonyl amines, acyloximes, formanilidine. The deprotecting reaction can, for example, be triggered by either temperature, light, pH or presence of water/humidity.

Further suitable compounds B) are, for example, listed in unpublished European patent applications with application number 17186543.9 (INV 170338) and 17186544.7 (INV 170938).

As mentioned above, compound B) may also comprise at least one polymerizable, ethylenically unsaturated group. Preferred compound B) with at least one polymerizable, ethylenically unsaturated group are compounds B) with one amino group and one polymerizable, ethylenically unsaturated group.

Preferred examples of polymerizable, ethylenically unsaturated groups are the vinyl group $H_2C=CH-$, the olefinic group $-HC=CH-$, wherein the two carbon atoms of the double bond are each substituted by one hydrogen, only, and the further substituents are notably carbon atoms, and the acrylic or methacrylic group, shortly referred to as (meth)acrylic group. In this patent application the term "vinyl group" does not include the (meth)acrylic group.

In a more preferred embodiment, the optional polymerizable, ethylenically unsaturated group of compound B) is a vinyl group.

Suitable compounds B) are for example aminopropyl amine vinyl ether and allyl amine, see formulas below:

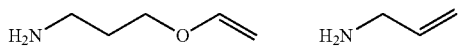

To Compound C)

Compounds C) are compounds with at least one polymerizable, ethylenically unsaturated group.

Compounds C) do not comprise five-membered cyclic monothiocarbonate groups and do not comprise amino groups.

Compound C) may have, for example, a molecular weight of up to 500.000 g/mol. The latter might be the case if compound C) is a high molecular compound such as a polymer.

Compound C) may be, for example, a urethane groups comprising adduct obtained by reacting compounds with monothiocarbonate groups, compounds with primary or secondary amino groups and compounds with unsaturated groups in a ratio that all monothiocarbonate groups and amino groups are reacted and only unsaturated groups remain.

Preferred compounds C) have a molecular weight of up to 10000 g/mol, notably of up to 5000 g/mol and particularly of up to 1000 g/mol. Most preferred are compounds C) having a molecular weight of from 60 g/mol to 500 g/mol.

In a preferred embodiment compounds C) do not comprise any other functional groups than polymerizable, ethylenically unsaturated groups and optionally ether or carboxylic ester groups.

In a preferred embodiment, compounds C) comprise 1 to 10 polymerizable, ethylenically unsaturated groups, preferably 1 or 5 polymerizable, ethylenically unsaturated groups and, in a most preferred embodiment compound C) comprises 1 to 3 polymerizable, ethylenically unsaturated groups.

Preferred examples of polymerizable, ethylenically unsaturated group are the vinyl group $H_2C=CH-$, the olefinic group $-HC=CH-$, wherein the two carbon atoms of the double bond are each substituted by one hydrogen, only, and the further substituents are notably carbon atoms, including carbon atoms of a cyclic system, and the acrylic or methacrylic group, shortly referred to as (meth)acrylic group. In this patent application the term "vinyl group" does not include the (meth)acrylic group.

Particularly preferred ethylenically unsaturated groups for compounds C) are the vinyl group and the (meth)acrylic group.

The most preferred ethylenically unsaturated group of compounds C) is the methacrylic group.

Compounds C) with one ethylenically unsaturated group are, for example, (meth)acrylic acid, (meth)acrylic esters, itaconic esters or lactones, citraconic esters or lactones, vinylesters, for example vinyl acetate, vinyl ethers, vinyl lactames, for example N-vinyl pyrrolidone, vinyl aromatics as styrene, vinyl halogenids as vinyl chloride or vinyl fluoride or olefines with one carbon-carbon double bond, such as ethylene, propylene or cyclic olefin compounds like norbornene type compounds.

Compounds C) with more than one ethylenically unsaturated group are, for example, compounds with at least two (meth)acrylic groups, at least two vinyl groups or olefines with at least two carbon-carbon double bonds or polyolefines, such as polybutadiene or polyisoprene and unsaturated polyesters notably polyesters of maleic acid, fumaric acid or itaconic acid and citraconic acid.

Olefins with exactly two carbon-carbon double bonds are, for example, butadiene, cyclooctadiene, cyclododecatriene, norbornadiene, vinyl-norbornene, isoprene, limonene, divinyl cyclohexane or dicyclpentadiene.

Oligomers with at least two acrylic or methacrylic groups are in particular (meth)acrylic esters of polyfunctional alcohols or of alkoxylated polyfunctional alcohols or compounds obtained by reacting (meth)acrylic compounds that have hydroxy groups, for example hydroxy alkyl (meth)acrylates, with compounds having at least one isocyanate group.

(Meth)acrylic esters of polyesterols may also be mentioned as oligomers.

Adducts of (meth)acrylic acid and epoxide compounds (known as epoxy based vinylesters) or urethane (meth)acrylates may also be suitable oligomers.

Oligomers with at least two vinyl groups are, for example divinylether such as diethylenglycol- or triethylenglycol-divinylether.

In a preferred embodiment, compounds C) with polymerizable ethylenically unsaturated groups are (meth)acrylic compounds, in particular (meth)acrylates of polyfunctional alcohols, or compounds with vinyl ether groups or unsaturated polyesters. In a particularly preferred embodiment compounds C) with polymerizable ethylenically unsaturated groups are methacrylic compounds.

To the binder of the coating composition or sealant

Compounds A), B) and optionally C) react to form a polymer which is the binder of the obtained coating or seal.

The principles of the reaction of compound A), B) and optionally C) are described in earlier European patent applications with application number 17186543.9 (INV 170338) and 17186544.7 (INV 170938).

The ring system of the five-membered cyclic monothiocarbonate group of compound A) is opened by the amino group of compound B), resulting in an adduct with a mercapto group —SH.

The mercapto groups —SH of the adduct may be further reacted with a —SH reactive group, notably a polymerizable, ethylenically unsaturated group, either of compound A) or B) itself or of the additional compound C). The mercapto group adds to the —SH reactive group. The addition of a polymerizable, ethylenically unsaturated group to —SH is known as Michael addition or thiol-ene reaction.

The following table shows combinations of compound A) with cyclic monothiocarbonate groups (TC), compound B) with primary or secondary amino groups (shortly amino groups) and compound C with unsaturated groups which are suitable for the coating compositions and sealants of this patent application. The combinations of A), B) and C) result in polymers P1 to P5. In Table 1 the number of TC-groups, amino groups and functional groups is listed.

TABLE 1

Number of functional groups of compounds A), B) and C)

| Polymer obtained | Compound A TC-group | Compound A unsaturated group | Compound B amino group | Compound B unsaturated group | Compound C unsaturated group |
|---|---|---|---|---|---|
| P1 | ≥1 | ≥1 | ≥1 |  | Optional[1] |
| P2 | ≥1 |  | ≥1 | ≥1 | Optional[1] |
| P3 | ≥2 |  | ≥2 |  | Optional[1] |
| P4 | ≥1 |  | ≥2 |  | ≥2 |
| P5 | ≥2 |  | ≥1 |  | ≥2 |

[1]compounds C are optional, only

Polymers P1 and P2 are obtained by a head to tail polyaddition of the mercapto group and the polymerizable, ethylenically unsaturated group (shortly unsaturated group).

In case of polymer P1, the monothiocarbonate group (shortly TC-group) is opened by the at least one amino group of compound B) resulting in an adduct comprising a mercapto group and an unsaturated group which then undergoes a head to tail polyaddition see, for example, the following reaction:

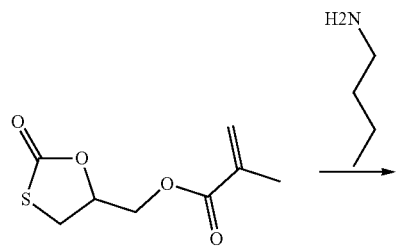

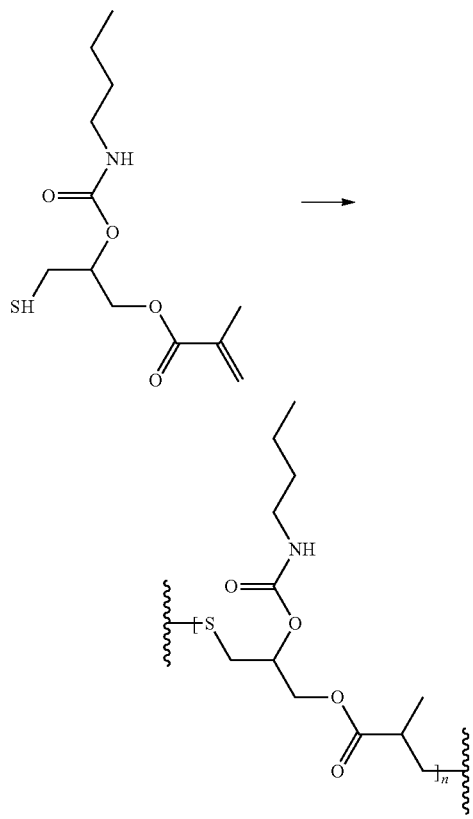

The same applies to polymer P2, with the only difference that the unsaturated group is now provided by compound B).

Polymers P3 to P5 are obtained in analogy to usual polyaddition reactions where at least two compounds have at least two functional groups.

Polymer P3 is obtained from a compound A) with two five-membered cyclic monothiocarbonate groups and a compound B) with two amino groups, see for example, the following reaction:

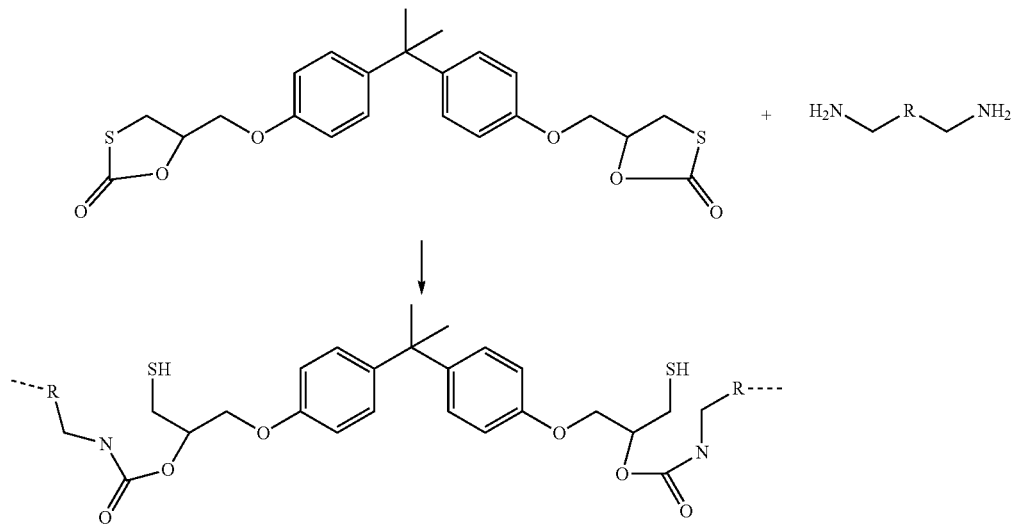

In case of polymers P4 and P5 an additional compound C) is used. The unsaturated groups of C) react with any mercapto groups of the adduct from compound A) and B). Due to the additional functional groups provided by compound C), the functionality of compounds A) or b) may be reduced to at least 1, as it is shown in the table above.

It should be mentioned that the mercapto groups —SH that are not reacted with unsaturated groups may oxidize and will form disulfide bridges. Such oxidation may occur at room temperature in the presence of oxygen or other oxidants. Disulfide bridges may improve mechanical properties of the polymers obtained.

The obtained polymer comprises as structural element a urethane group with a sulfur atom being bonded via an ethylene group to the oxygen of the urethane group. This structural element can be represented by the following formula:

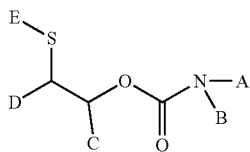

The variables A to E represent any possible substitutions by substituents.

Preferred is a coating composition or sealant comprising at least one compound A), B) or C) with at least one polymerizable, ethylenically unsaturated group.

Such preferred coating composition or sealant includes a coating composition or sealant wherein at least one of compounds A) or B), preferably one of compounds A) or B) comprises at least one polymerizable, ethylenically unsaturated group. Such a coating composition or sealant may optionally comprise a further compound C) but does not require a further compound C).

Such preferred coating composition or sealant further includes a coating composition or sealant wherein both compound A) and compound B) do not comprise a polymerizable, ethylenically unsaturated group and wherein the coating composition or sealant comprises a compound C).

Particularly preferred are coating compositions or sealants comprising compound A) with cyclic monothiocarbonate groups (TC), compound B) with primary or secondary amino groups (shortly amino groups) and compound C with unsaturated groups according to Table 2.

TABLE 2

Preferred number of functional groups of compounds A), B) and C)

| | Compound A | | Compound B | | Compound C |
|---|---|---|---|---|---|
| Polymer | TC-group | unsaturated group | amino group | unsaturated group | unsaturated group |
| P1 | 1 | 1 | 1 | | optional |
| P2 | 1 | | 1 | 1 | optional |
| P3 | 2 | | 2 | | optional |
| P4 | 1 | | 2 or 3 | | 2 or 3 |
| P5 | 2 or 3 | | 1 | | 2 or 3 |

The coating composition or sealant may comprise further compounds than those that are required for polymers P1 to P5 as listed in the tables above. Notably, the coating composition or sealant may comprise additional compounds A), B), or C) with one functional group. The additional use of compounds with one functional use may reduce the molecular weight or may reduce crosslinking reactions.

In a preferred embodiment, compound A) is liquid at 21° C., 1 bar.

Compound A) may be a mixture of different compounds A). Notably compound A) may be obtained by dissolving a compound A) which is solid at 21° C., 1 bar in a compound A which is liquid at 21° C., 1 bar, thus obtaining as compound A) a mixture of different compounds A) which is liquid at 21° C., 1 bar.

Compounds A), B) and optionally C) react as described above and form a polymer which is the binder of the obtained coating or seal.

The coating composition or sealant may comprise further compounds that contribute to the binder.

Preferably, the coating composition or sealant comprises 0.8 to 1.2 mol amino groups of compound B) per 1 mol of five-membered cyclic monothiocarbonate groups of compound A).

Optionally, compounds D) that comprise other —SH reactive groups than polymerizable, ethylenically unsaturated groups may be used to form the binder of the coating composition or sealant. Such —SH reactive groups are notably epoxy groups.

Preferably, the coating composition or sealant comprises 0.5 to 1.2 mol —SH reactive groups of compounds A), B), C) and D) per 1 mol of five-membered cyclic monothiocarbonate groups of compound A).

In a preferred embodiment, the binder of the obtained coating or sealant consists to at least 60% by weight, more preferably to at least 80% by weight, most preferably to at least 90% by weight of compounds A), B) and C), only. In a specifically preferred embodiment, the binder of the obtained coating or sealant consists to at least 95% by weight of compounds A), B) and C). Notably, the binder of the obtained coating or sealant consists to 100% by weight of compounds A), B) and C).

To further constituents of the coating composition or sealant

The coating composition or sealant may consist of the binder, only, or may comprise further compounds, such as catalysts, stabilizers, solvents, pigments or fillers or further additives that are desired or required for the application intended.

Catalysts may be used to support the reaction of compound A), B) and optionally C). A radical mechanism of the addition reaction is supported by initiators that form radicals. Such initiators are either thermal, redox, electrochemical or photoactive initiators well known from radical polymerization.

Solvents may be used, for example, to adjust the viscosity. Suitable solvents are, for example, ethylacetate, butylacetate, methyl ethyl ketone, dioxane, methanol, ethanol, water, tetrahydrofuran and dimethylformamide. It is an advantage of the process that usually no additional solvent is required as usually at least one of the compounds A), B) and optionally C) may be liquid and may serve already as solvent.

Stabilizers are, for example, redox stabilizers that reduce or avoid oxidation of S—H groups which might be a side reaction may be added. Oxidation of S—H groups may lead to disulfide bridges between neighbored molecules thus reducing the number of S—H groups available for the reaction with the polymerizable, ethylenically unsaturated group. Examples of such stabilizers are trialkylphosphines or triarylphosphines. Further stabilizers are UV stabilizers, preservatives. Fillers and pigments may be used, for example, to obtain certain application properties and/or a desired appearance of the coating or seal. A main purpose of fillers is also to reduce the amount of binder required to fill a gap or cavity or required to obtain the desired thickness of coatings.

Examples of suitable fillers include naturally occurring silicates or aluminum silicates or magnesium silicates, such as kaolin, talc, siliceous earths, mica or alkaline earth metal carbonates, preferably calcium carbonate in the form of calcide, chalk or dolomite. Mention may additionally be made of oxides and hydroxides, such as quartz flour, aluminum trihydroxide, magnesium hydroxide or calcium hydroxide. Precipitated silica or silicates or pyrogenic silica are synthetically obtainable fillers.

A typical pigment is, for example, titanium dioxide, preferably in the rutile form. Other white or colored pigments are, for example, zinc oxide, barytes, carbon black or graphite or iron oxides. Synthetic organic hollow pigments are likewise known and are usually used in a blend with white pigments. Highly abrasion-resistant materials such as □-aluminum oxide, boron carbide or silicon carbide are employed in a small amount in finely ground form in specialty applications.

Fillers and pigments may be used in mixtures. The average particle size (expressed as the d50 value) of fillers and pigments is preferably in the range from 0.1 to 200 µm, notably in the range from 1 to 50 µm.

In a preferred embodiment, the coating composition or sealant comprises fillers or pigments or mixtures thereof. Preferably, the coating composition or sealant comprises 5 to 500, more preferably 10 to 200 parts by weight of pigments or fillers per 100 parts by weight of all compounds A), B) and C).

Further additives are, for example wetting agents, such as sodium or potassium polyphosphates, polyacrylic acids, their alkali metal salts, polyvinyl alcohols, thickeners such as hydroxyethylcellulose, defoamers, hydrophobicizers, leveling agents, flame retardants, fibers and dyes, adhesion promotors, anticorrosive additives, antistatic or conductivity additives, additives which impart barrier function to the coating or sealant or additives which affect the refractive index and hence improve the optical appearance (gloss).

Application of the Coating Composition or Sealant

The coating composition or sealant comprises at least two components:
- a first component which comprises a compound A) with at least one five-membered cyclic monothiocarbonate group and
- a second component which comprises a compound B) with at least one amino group, selected from primary or secondary amino groups or blocked primary or secondary amino groups, hereinafter referred to as amino groups.

Any compound C) that may be used in addition, as well as any further constituent of the coating composition or sealant may be added to the first component or the second component. Compounds C) may also be added after mixing the first and second component.

If the amino groups of compound B) are blocked amino groups, the first and the second component may be combined to give a stable and storable coating composition or sealant, such stable and storable compositions are known as 1 K (one component) compositions.

If the amino groups of compound B) are not blocked amino groups, the first and the second component should be kept separate and should be mixed shortly before the application as coating composition or sealant, such compositions are known as 2 K (two component) compositions.

The reaction between compounds A), B) and C) starts usually already at room temperature (20° C.) and may be completed at room temperature. The reaction may be supported by increasing the temperature of the coating composition or sealant, for example up to 100° C. Alternatively or in addition, any activation energy for the reactions may be provided by high-energy radiation such as visible or UV-light. It is an advantage of the invention that the reaction easily occurs at low temperature and does not require supply of significant further energy such as high temperatures or high energy radiation.

The coating composition may be applied by usual means, such as knife coating, roller coating, spraying to any surfaces, notably surfaces of wood, mineral surfaces, metal surfaces, fabric or surfaces of synthetic polymers. The coating composition may be used as single coating or may be used in multi-layer coating systems or powder coatings.

The coating may be a protective coating or a decorative coating.

In a preferred embodiment, the coating composition is applied to a surface and cured to obtain a coating with a thickness of 0.01 to 10 millimeter.

The sealant may be applied to a gap or cavity and cured to obtain a sealed material. It may be used to fill gaps or cavities in any kind of material, for example mineral materials such as concrete, drywall, screed, or wood.

Coatings and sealed materials are easily and economically obtained by the process of this invention. The process is not sensitive to humidity or oxygen. The process may usually be performed at room temperature without further supply of energy. The process does not require the presence of compounds with mercaptane groups but nevertheless provides coatings and seal materials comprising sulfur and the benefits resulting therefrom, such as adhesion, barrier function, chemical resistance, reduced corrosivity and a high refractive index. The coatings and seals obtained have good application properties, notably good mechanical properties.

EXAMPLES

Test Methods

Pendulum Hardness

The coating composition is coated on a glass plate at room temperature and stored at room temperature for 6 days. Thereafter they were kept at 60° C. for 5 days. The pendulum hardness was determined by the method of Koenig on glass plates (DIN EN ISO 1522).

In Table 3 the number of oscillations is listed.

Cross-Cut

The cross-cut was determined in accordance with DIN EN ISO 2409 on a Bonder panel.

The obtained coatings were first kept at room temperature for 6 days. Thereafter they were kept at 60° C. for 5 days. The curing was followed by conditioning at 23±2° C. and 50±10% humidity for one day (1 d) or seven days (7 d). The adhesion of the coating to the panel was judged pursuant to a scale of 0 to 100%. with 100% standing for "no detachment of the coating layer observed" and 0 standing for "full detachment".

Erichsen Deep Drawing

The Erichsen deep drawing was determined according to DIN EN ISO 20482/DIN EN ISO 1520. The Erichsen deep indicates the flexibility of the coating. Fur such purpose the coating is subjected to bending stresses in a bending tester.

The coating composition is coated on a metal plate at room temperature and stored at room temperature for 6 days. Thereafter they were kept at 60° C. for 5 days. The coated side of the metal plate is deformed by a punch with a defined pressure. On the other side of the metal plate a bulge is formed. The depth of the bulge when first cracks become visible in the coating is a measure of elasticity of the coating. Values for the depth of the bulge are reported in millimeter (mm) in Table 3.

Following compounds have been used in the examples:
Compound A:

Bis-1,3-Oxathiolan-2-one, 5,5'[1,4-butanediylbis(oxymethylene)] of Formula

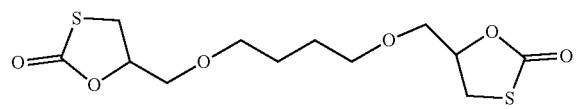 [SMILES: O=C1OC(COCCCCOCC2CSC(=O)O2)CS1]

1,2-Cyclohexanedicarboxylic acid, 1,2-bis[2-oxo-1,3-Oxathiolan-5-yl] ester of Formula

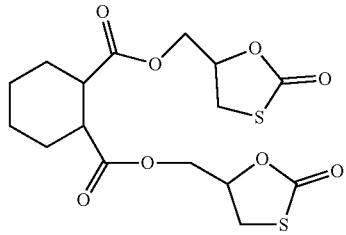 [SMILES: O=C1OC(COC(=O)C2CCCCC2C(=O)OCC2CSC(=O)O2)CS1]

Compound B:

1,3-Bis(aminomethyl)cyclohexane of Formula

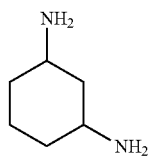

Compound C:

Di-hydroxyethylmethacrylat-trimethylhexyl-dicarbamate of Formula

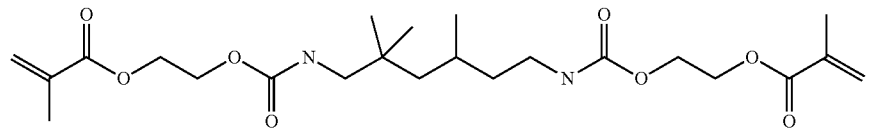 [SMILES: C=C(C)C(=O)OCCOC(=O)NCCC(C)CC(C)(C)CNC(=O)OCCOC(=O)C(=C)C]

Bisphenol A-glycerolat-dimethacrylat

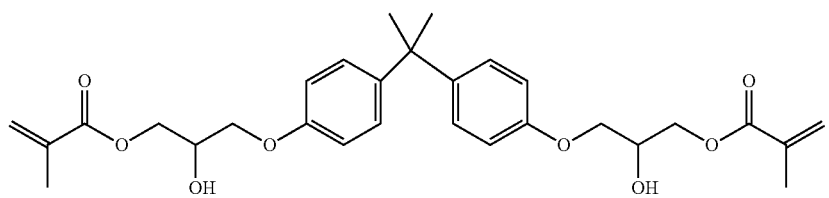 [SMILES: C=C(C)C(=O)OCC(O)COc1ccc(C(C)(C)c2ccc(OCC(O)COC(=O)C(=C)C)cc2)cc1]

Trimethylolpropane Trimethacrylate

Synthesis of bis-1,3-oxathiolan-2-one, 5,5'[1,4-butanediylbis(oxymethylene)] of Formula 5

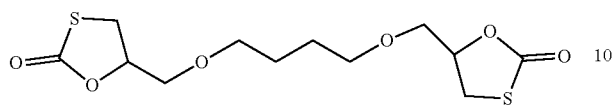

First Step: Phosgenation of 1,4-butanediolbisglycidylether

Into a 2 L stirred tank glas reactor equipped with two condensers (−30° C. and −78° C. (dry ice)) phosgene dip pipe and internal thermometer 980 g (4.60 mol, 1.00 eq.) 1,4-butanediolbisglycidylether were introduced under an atmosphere of nitrogen. After the addition of the starting material the cooling of the tank reactor was turned on and was adjusted to 15° C. After the reactor reached this temperature, 13.5 g (0.0490 mol, 1.00 mol %) tetrabutylammonium chloride (TBACl) were added. After solvation of the TBACl gaseous phosgene (overall 1011 g, 10.2 mol, 2.22 eq.) was added to the reactor via the dip pipe. The temperature of the reaction mixture was continuously monitored and was kept below 25° C. by carefully adjusting the rate of the phosgene addition. Overall the phosgene addition took approximately 10 h. After the phosgene addition was completed the initial cooling of the reactor was replaced by slight heating (30° C.). The reaction mixture was stirred at this temperature for 2 h. Afterwards the reaction mixture was stripped, with nitrogen at 30° C., phosgene-free overnight. The resulting colorless, slightly viscous oil (1834 g, 4.59 mol, >99% yield, regioisomeric purity: ca. 95%) was directly used, without further purification, for the thiocarbonate formation.

Second Step: Reaction With Sulfur Compound

The respective β-chloroalkyl chloroformiate ([2-chloro-1-[4-(3-chloro-2-chlorocarbonyloxypropoxy)butoxymethyl]ethyl] carbonochloridate) (845 g, 2.1 mol) and dichloromethane (2.5 L) are placed in a 8 L reactor. The solution was cooled down to 0° C. before Na2S (2 equiv., 15 wt % aqueous solution) was slowly added, maintaining the temperature at 5° C. After the complete addition the reaction mixture was allowed to warm to room temperature. The phases were separated and the aqueous phase was extracted with dichloromethane (0.5 L). The solvent was removed from the combined organic phases under reduced pressure. The viscous oil was redisolved in 0.3 L dichloromethane and filtered over Celite. After removal of the solvent under reduced pressure the desired product was obtained a as a clear viscous oil (656 g, 96%).

Synthesis of 1,2-cyclohexanedicarboxylic acid, 1,2-bis[2-oxo-1,3-oxathiolan-5-yl] ester

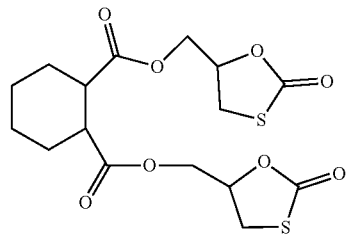 [SMILES: O=C1OC(COC(=O)C2CCCCC2C(=O)OCC2CSC(=O)O2)CS1]

First Step: Phosgenation of bis(2,3-epoxpropyl)-cyclohexan-1,2-dicarboxylate Into a 250 ml stirred tank glas reactor equipped with two condensers (−30° C. and −78° C. (dry ice)) phosgene dip pipe and internal thermometer 115 g (0.404 mol, 1.00 eq.) Bis(2,3-epoxpropyl)-cyclohexan-1,2-dicarboxylate were introduced under an atmosphere of nitrogen. After the addition of the starting material, 2.20 g (8.00 mmol, 1 mol %) tetrabutylammonium chloride (TBACl) were added. After solvation of the TBACl gaseous phosgene (overall 100 g, 1.01 mol, 2.50 eq.) was added to the reactor via the dip pipe. The temperature of the reaction mixture was continuously monitored and was kept below 40° C. by carefully adjusting the rate of the phosgene addition. Overall the phosgene addition took approximately 4 h. After the phosgene addition was completed, the reaction mixture was heated to 45° C. and stirred for further 2 h. Afterwards the reaction mixture was stripped, with nitrogen at 45° C., phosgene-free overnight. The resulting colorless, highly viscous oil (179 g, 0.370 mol, 92% yield, regioisomeric purity: ca. 95%) was directly used, without further purification, for the thiocarbonate formation.

Second Step: Reaction With Sulfur Compound

The β-chloroalkyl chloroformiate (bis(3-chloro-2-chlorocarbonyloxy-propyl) cyclohexane-1,2-dicarboxylate) (320 g, 0.66 mol) and dichloromethane (0.8 L) are placed in a 4 L reactor. The solution was cooled down to 0° C. before Na2S (2 equiv., 15 wt % aqueous solution) was slowly added, maintaining the temperature at 5° C. After the complete addition the reaction mixture was allowed to warm to room temperature. The phases were separated and the aqueous phase was extracted with dichloromethane (0.5 L). The solvent was removed from the combined organic phases under reduced pressure. The viscous oil was redisolved in 0.3 L dichloromethane and filtered over Celite. After removal of the solvent under reduced pressure the desired product was obtained a as a clear viscous oil (240 g, 74%).

Example 1

Bis-1,3-Oxathiolan-2-one, 5,5'[1,4-butanediylbis(oxymethylene)] [5 g] and Bisphenol A-glycerolat-dimethacrylat (CAS 1565-94-2) [7.9 g] were mixed under stirring at room temperature. Subsequently, 1,3-Bis(aminomethyl)cyclohexane [2.2 g] was added and stirring was continued for additional 20 min at room temperature, increasing viscosity over time. The reaction mixture was transferred to coating application via doctor blade (60 mu) using various substrates:
glass
steel
polycarbonate (PC)

A homogeneous film could be applied to the various substrates. The samples were cured at room temperature until they were completely dry (t<24 h)

Example 2

Bis-1,3-Oxathiolan-2-one, 5,5'[1,4-butanediylbis(oxymethylene)] [5 g], Trimethylolpropane trimethacrylate [1.75 g] and Di-HEMA-trimethylhexyl dicarbamate (CAS 72869-86-4, Isomeric mixture) [3.65 g] were mixed under stirring at room temperature. Subsequently, 1,3-Bis(aminomethyl)cyclohexane [2.2 g] was added and stirring was continued for additional 20 min at room temperature, increasing viscosity over time. The reaction mixture was transferred to coating application via doctor blade (60 mu) using various substrates:
glass
steel
polycarbonate (PC)

A homogeneous film could be applied to the various substrates. The samples were cured at room temperature until they were completely dry (t<48 h).

Example 3

Bis-1,3-Oxathiolan-2-one, 5,5'[1,4-butanediylbis(oxymethylene)] [5 g], Trimethylolpropane trimethacrylate [3.49 g] were mixed under stirring at room temperature. Subsequently, 1,3-Bis(aminomethyl)cyclohexane [2.2 g] was added and stirring was continued for additional 20 min at room temperature, increasing viscosity over time. The reaction mixture was transferred to coating application via doctor blade (60 mu). Substrates:
glass, steel.

A homogeneous film could be applied to the various substrates. The samples were cured at room temperature until they were completely dry (t<48 h).

Example 4

1,2-Cyclohexanedicarboxylic acid, 1,2-bis[2-oxo-1,3-Oxathiolan-5-yl] ester [5 g], Trimethylolpropane trimethacrylate [2.78 g] were mixed under stirring at room temperature. Subsequently, 1,3-Bis(aminomethyl)cyclohexane [2.1 g] was added and stirring was continued for additional 3 min, increasing viscosity over time. The reaction mixture was transferred to coating application via doctor blade (60 mu) employing glass, steel and PC substrates.

The coatings were completely dry after 90 min at room temperature.

TABLE 3

| | properties of coatings | | |
|---|---|---|---|
| | Pendulum Hardness oscillations | Cross-cut test % | Erichsen mm |
| Example 1 | 142 | 100 | 10.8 |
| Example 2 | 78 | 90 | >11 |

TABLE 3-continued

| | properties of coatings | | |
|---|---|---|---|
| | Pendulum Hardness oscillations | Cross-cut test % | Erichsen mm |
| Example 3 | 23 | 80 | 10.2 |
| Example 4 | 125 | 95 | 10.1 |

The invention claimed is:

1. A process comprising:
preparing a coating or sealed material using a coating composition or a sealant, wherein the coating composition or the sealant comprises:
a first component which comprises at least one compound A) with at least one five-membered cyclic monothiocarbonate group, and
a second component which comprises a compound B) with at least one amino group, selected from the group consisting of a primary amino group, a secondary amino group, a blocked primary amino group, and a blocked secondary amino group
wherein said at least one compound A) or compound B) optionally have at least one polymerizable, ethylenically unsaturated group, and
wherein the coating composition or the sealant optionally comprises compound C) with at least one polymerizable, ethylenically unsaturated group
wherein the coating composition or the sealant comprises at least one compound A), compound B), or compound C) with at least one polymerizable, ethylenically unsaturated group.

2. The process according to claim 1, wherein said at least one compound A) is a compound of formula I

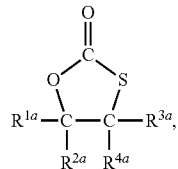

Formula I with $R^{1a}$ to $R^{4a}$ independently from each other representing hydrogen or an organic group with up to 50 carbon atoms whereby, alternatively, $R^{2a}$, $R^{4a}$ and the two carbon atoms of the thiocarbonate group, together, form a five to ten membered carbon ring, or
a compound of formula II

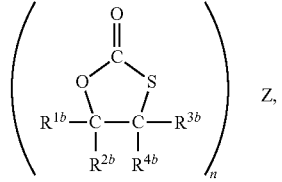

Formula II with $R^{1b}$ to $R^{4b}$ independently from each other representing hydrogen or an organic group with up to 50 carbon atoms whereby, alternatively, $R^{2b}$, $R^{4b}$ and the two carbon atoms of the monothiocarbonate group, together, form a five to ten membered carbon ring, and with one of the groups $R^{1b}$ to $R^{4b}$ being a linking group to Z, n representing an integral number of at least 2 and Z representing a n-valent organic group.

3. The process according to claim 2, wherein said at least one compound A) and compound B) do not comprise a polymerizable, ethylenically unsaturated group and the coating composition or the sealant comprises compound C).

4. The process according to claim 2, wherein three of $R^{1a}$ to $R^{4a}$ in formula II represent hydrogen and the remaining group of $R^{1a}$ to $R^{4a}$ represents an organic group with up to 30 carbon atoms and said remaining group is $R^{1a}$ or $R^{2a}$.

5. The process according to claim 2, three of the groups $R^{1b}$ to $R^{4b}$ represent hydrogen and the remaining group of $R^{1b}$ to $R^{4b}$ is the linking group Z which is an n-valent organic group with up to 30 carbon atoms.

6. The process according to claim 1, wherein one of said at least one compound A) or compound B) comprises at least one polymerizable, ethylenically unsaturated group.

7. The process according to claim 1, wherein said at least one compound A) is in a liquid state at 21° C., 1 bar.

8. The process according to claim 7, wherein the liquid state of said at least one compound A) is obtained by dissolving a first compound A) which is solid at 21° C., 1 bar into a second compound A) which is liquid at 21° C., 1 bar.

9. The process according to claim 1, wherein the coating composition or the sealant comprises 0.8 to 1.2 mol of the at least one amino group of compound B) per 1 mol of the at least one five-membered cyclic monothiocarbonate group of compound A).

10. The process according to claim 1, wherein the coating composition or the sealant comprises 5 to 500 parts by weight of pigments or fillers per 100 parts by weight of said at least one compound A), compound B), and compound C).

11. The process according to claim 1, wherein the coating composition is applied to a surface and cured to obtain a coating with a thickness of 0.01 to 10 millimeter.

12. The process according to claim 1, wherein the sealant is applied to a gap or cavity and cured to obtain a sealed material.

13. The process according to claim 1, wherein the coating composition is applied to a surface and cured to obtain a coating with a thickness of 0.01 to 10 millimeter, or the sealant is applied to a gap or cavity and cured to obtain a sealed material.

14. The process according to claim 1, wherein compounds A), B) and optionally C) react to form a polymer which is the binder of the obtained coating or sealant.

* * * * *